(No Model.) 2 Sheets—Sheet 2.
W. M. DARROW.
PIPE COUPLING FOR CAR BRAKES.
No. 398,033. Patented Feb. 19, 1889.
Fig. 8. Fig. 9. Fig. 10.
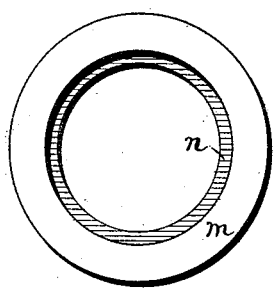
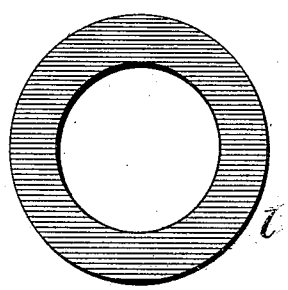
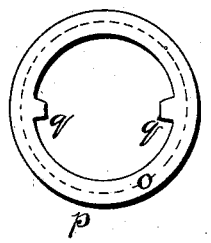
Fig. 7.
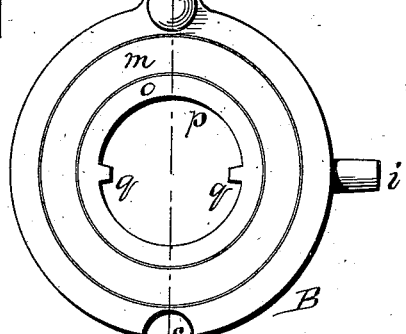
Fig. 6.
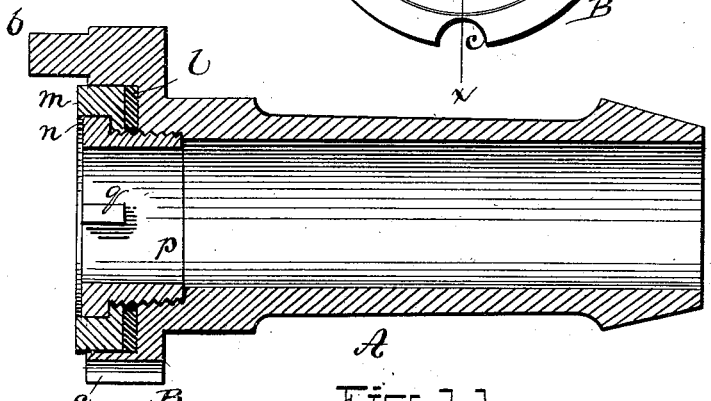
Fig. 11.
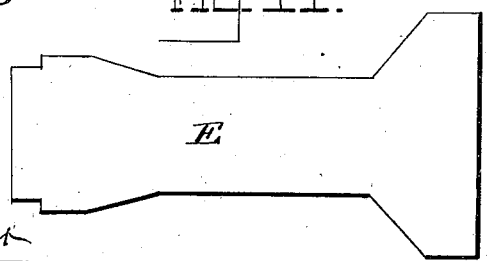
WITNESSES:
D. D. Mott
C. Sedgwick
INVENTOR,
W. M. Darrow
BY Munn & Co
ATTORNEYS.

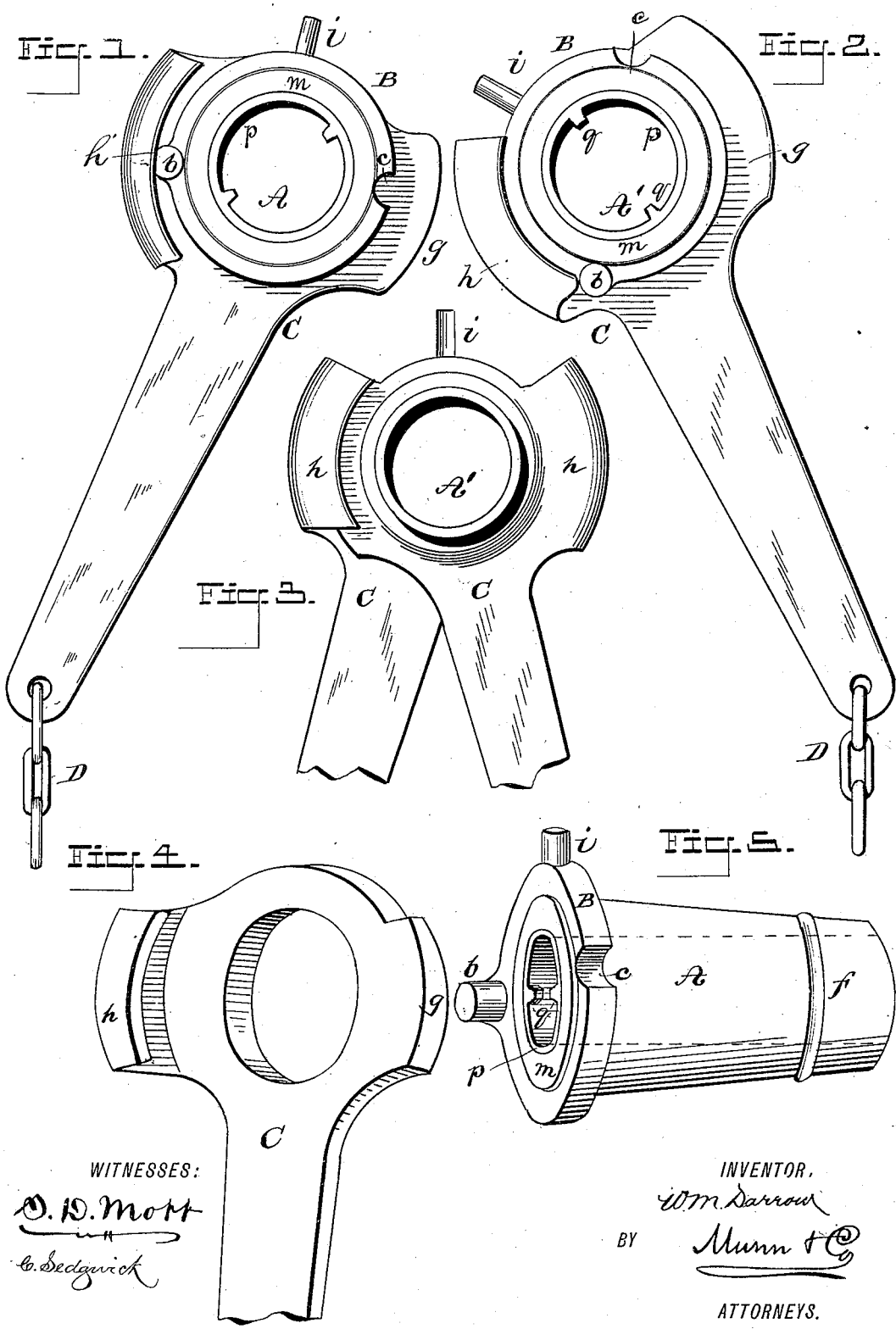

UNITED STATES PATENT OFFICE.

WILLIAM M. DARROW, OF SALEM, NEW YORK.

PIPE-COUPLING FOR CAR-BRAKES.

SPECIFICATION forming part of Letters Patent No. 398,033, dated February 19, 1889.

Application filed May 21, 1888. Serial No. 274,584. (No model.)

*To all whom it may concern:*

Be it known that I, WILLIAM M. DARROW, of Salem, in the county of Washington and State of New York, have invented a new and Improved Pipe-Coupling for Car-Brakes, of which the following is a specification, reference being had to the annexed drawings, forming a part thereof, in which—

Figures 1 and 2 are end elevations of the halves of my improved pipe-coupling. Fig. 3 is an end elevation of the complete coupling. Fig. 4 is a perspective view of one of the coupling-levers. Fig. 5 is a perspective view of one of the pipe ends of the coupling. Fig. 6 is a longitudinal section of one of the pipe ends. Fig. 7 is an end elevation of the same. Fig. 8 is a face view of the removable contact surface or seat. Fig. 9 is a face view of the packing-ring. Fig. 10 is an end elevation of the seat-holding thimble, and Fig. 11 is a side elevation of the wrench for inserting and removing the thimble.

Similar letters of reference indicate corresponding parts in all the views.

The object of my invention is to provide a simple and effective coupling for uniting the pipes at the ends of the cars for air-brake and steam-heating purposes and for use in connection with water-hose.

The invention consists in the particular construction and arrangement of parts, as hereinafter fully described, and pointed out in the claims.

The coupling is formed of two sleeves, A A', each provided with a recessed flange, B, and the cam-levers C C, adapted to embrace the flanged sleeves and interlock. The flanges B are each provided with a stud, $b$, which fits into a notch, $c$, in the edge of the opposite flange.

In the bottom of the recess of the flange B is placed a packing-ring, $l$, of soft lead or other suitable packing material. Upon the packing-ring $l$ is placed a contact-ring or annular seat, $m$, which is provided in its inner edge with a rabbet, $n$, for receiving the flanged end $o$ of the threaded thimble $p$, which is screwed into the internally-threaded end of the sleeve A, clamping the seat $m$ firmly upon the packing-ring $l$. The thimble $p$ is provided with inwardly-projecting lugs $q$, which facilitate inserting and removing the thimble. The wrench E (shown in Fig. 11) is used for turning the thimble $p$, and is itself turned by an ordinary wrench.

The sleeves A A' pass through holes in the cam-levers C C, and are tapered and provided with a bead, $f$, for receiving and retaining a flexible hose. Each cam-lever C is provided with a beveled ear, $g$, and with an inclined inwardly-turned lip, $h$. The lip $h$ of one-half of the coupling engages the ear $g$ of the other half as the parts of the coupling are brought together, and the halves of the coupling are made steam and air tight by turning the cam-levers one upon the other.

Each flange B is provided with a stud, $i$, to limit the turning of the flange, and to indicate when the two flanges are in position for coupling.

The coupling, when in use, is arranged in a pipe, which extends diagonally from one car to another, and chains D, which are shorter than the pipes to which the couplings are attached, are connected with the ends of the levers C and with the ends of the cars, so that when the cars pull apart the couplings will be released by the turning of the levers C, by means of the chains.

Having thus described my invention, I claim as new and desire to secure by Letters Patent—

1. In a pipe-coupling for cars, the combination, with the sleeves A A', provided with the flanges B, having studs $b$, notches $c$, and seat $m$, of the removable cam-levers C, each provided with an aperture, a beveled ear, $g$, and inclined and inwardly-turned lip $h$, the said ear and lip being opposite each other and adapted to engage the lip and ear of the other lever, substantially as herein shown and described.

2. In a pipe-coupling, the combination, with a sleeve internally screw-threaded at one end, of the packing $l$, the seat $m$, provided with the rabbet $n$, and the threaded thimble $p$, provided with the flanged end $o$, substantially as herein shown and described.

WILLIAM M. DARROW.

Witnesses:
ANNA A. RUSSELL,
BESSIE BROUGHTON.